United States Patent [19]

Dickey

[11] Patent Number: 4,672,716

[45] Date of Patent: Jun. 16, 1987

[54] MEAT TENDERIZING APPARATUS

[76] Inventor: Rosalie J. Dickey, 8311 Nunley Dr., Baltimore, Md. 21234

[21] Appl. No.: 820,092

[22] Filed: Jan. 21, 1986

Related U.S. Application Data

[63] Continuation of Ser. No. 583,687, Feb. 27, 1984, abandoned.

[51] Int. Cl.⁴ .............................................. A22C 9/00
[52] U.S. Cl. ....................................................... 17/26
[58] Field of Search ........................................... 17/26

[56] References Cited

U.S. PATENT DOCUMENTS

| | | | |
|---|---|---|---|
| 525,077 | 8/1894 | Hehsdörfer | 17/26 |
| 1,982,487 | 11/1934 | Swift | 17/26 |
| 2,047,567 | 7/1936 | Klinger | 241/100 |
| 2,131,397 | 9/1938 | Gurney | 17/26 |
| 2,176,751 | 10/1939 | Spang | 17/26 |
| 2,718,028 | 9/1955 | Read et al. | 17/26 |
| 2,886,845 | 5/1959 | Byland et al. | 17/26 |
| 3,222,712 | 12/1965 | Deckert | 17/26 |

FOREIGN PATENT DOCUMENTS 700403 12/1953 United Kingdom ................... 17/26

Primary Examiner—Willie G. Abercrombie
Attorney, Agent, or Firm—Walter G. Finch

[57] ABSTRACT

The invention concerns a meat tenderizing mechanism enclosed by a housing. The tenderizing mechanism includes two intermeshed roller assemblies which are driven by a manually rotated crank handle. Bladed disks of the roller assemblies are designed to tenderize a meat slice which is passed between the roller assemblies during unit operation. Stationary stripper plates are provided to remove a slice of meat from rotating bladed disks to prevent the meat from wrapping around the rollers. A receiving tray is located below the roller assemblies to catch the tenderized meat which may then be drawn from the housing for easy access to the tenderized meat.

5 Claims, 4 Drawing Figures

MEAT TENDERIZING APPARATUS

BACKGROUND OF THE INVENTION

This is a continuation of U.S. patent application Ser. No. 583,687 now abandoned, filed by applicant on Feb. 27, 1984, for "Meat Tenderizing Apparatus".

The invention concerns a mechanical meat-tenderizer which is manually operated.

The less expensive cuts of meat available to and often preferred by the general consumer tend to be tough and difficult to chew. To make these cuts of meat more palatable, different means have been proposed for tenderizing meat. Seasonings containing chemical tenderizers are commonly used to break down meat tissues and meat hammers are utilized to physically separate the tissues. However, a substantial number of consumers hesitate to add unnecessary chemicals to their food and other individuals consider the use of meat hammers to be too tedious.

A mechanical beef tenderer is proposed in U.S. Pat. No. 386,226 to Welch having three rollers. Two of the rollers are smooth and free-wheeling, while the third roller is provided with teeth having flat faces and sides. The device is operated by the rotation of a crank handle as a piece of beef is fed horizontally between the smooth and toothed rollers such that the flat faces of the teeth strike and thus tenderize the beef.

Bergstrom, in his U.S. Pat. No. 1,125,940 discloses a meat tenderer comprising a smooth roller and another roller having disks with cutting edges and disks with cutting blades. Rotation of a crank drives the smooth roller while the cutting roller is simultaneously driven by a gearing meachanism positioned at one end of both rollers. Two metal shelves are placed to receive and support the meat as it is run horizontally through the two rollers.

Finally the chicken steak machine taught by Wood in U.S. Pat. No. 1,991,439 involves the use of two rollers (one of which is free-wheeling) with circumferential rows of teeth interspaced by grooves. A roller adjusting device includes cam plates which allow for the adjustment of the relative roller positions in accordance with meat thickness. Tough meat is fed horizontally between the rollers as a crank is turned.

SUMMARY AND OBJECTS OF THE INVENTION

The invention concerns a meat tenderizing mechanism enclosed by a housing base and safety cover, wherein the base is secured to the cover by spring loaded knobs. The safety cover has a slot through which a piece of meat is fed and vertical feed guides which direct the meat to two roller assemblies. Each roller assembly includes an axle with a square cross-section, an alternating series of bladed disks and spacers mounted along the axle, a gear at one end of each disk-spacer series and all is secured by roller bearings on both ends of the assemblies.

The roller assemblies are slipped into spaced housing base slots such that the roller bearings are in rotatable contact with the housing base and the gears of the roller assemblies mesh. A crank handle, which can be utilized for left or right handed operation, is attached to one extended roller assembly axle. Rotation of the crank handle directly drives the roller assembly to which the handle is attached and drives the other assembly via the meshed gears.

The four rubber suction cups beneath the housing prevent slippage of the unit during operation.

When operating, the roller assemblies draw the meat inward as the bladed disks sever the meat tissues, thus tenderizing the meat. The two stationary teethed stripper plates are provided adjacent to the roller assemblies. As the bladed disks rotate, each bladed disk contacts a tooth of the stripper plate which strips the slice of meat from the rotating bladed disks and at the same time prevents the meat from wrapping around the rollers, thus allowing the meat to drop onto the receiving tray. Thus, the bladed disks are constantly cleaned during the unit operation to insure that further tenderizing of the meat is not inhibited.

Provided in the lower portion of the housing base below the roller assemblies and stripper plates is a horizontal slot in which a receiving tray is positioned. The tray extends through and beyond two sides of the housing base. Once the meat has passed between the roller assemblies, the tenderized meat is received or caught by the tray. The operator then pulls the tray from the horizontal slot and removes the tenderized meat from the tray.

An object of the present invention is to provide a meat tenderizing unit that is easily assembled and disassembled for sanitary maintenance.

It is also another object of this invention to provide a meat tenderizing unit which is completely washable and can be easily cleaned with a brush and dishwashing liquid and then thoroughly rinsed.

Another object of this invention is to present a meat tenderizing unit that is economical to use and also safe and easy to operate.

A further object of this invention is to realize a meat tenderizing unit wherein either left handed or right handed operation is readily available.

An additional object of this invention is to provide a unit for tenderizing meat which may be simply constructed in an inexpensive manner.

DETAILED DESCRIPTION OF THE INVENTION

Figure 1:
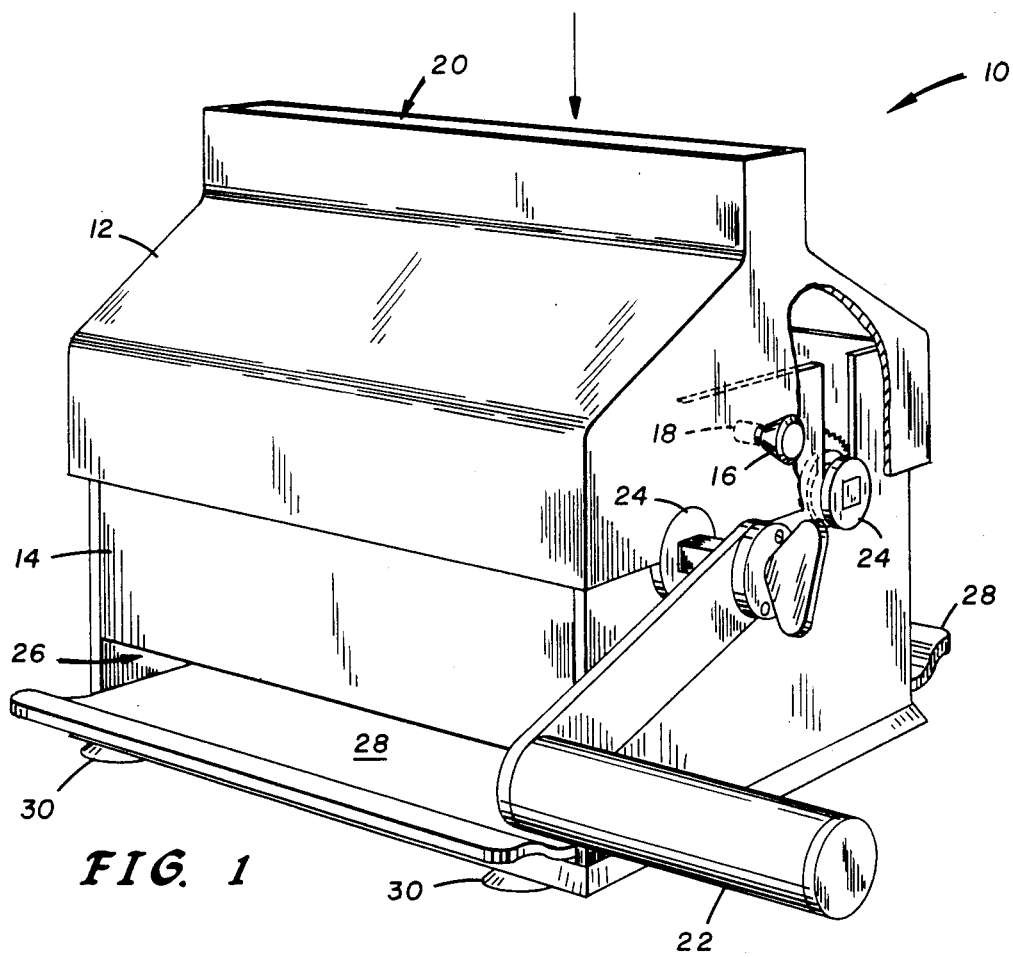
FIG. 1 shows a perspective of the invention as assembled for operation.

In FIG. 1 a view is provided of the invention in its assembled form showing the tenderizer unit at 10. The tenderizing unit 10 includes a housing comprising a cover 12 and a base 14 which form a substantially sanitary enclosure for the tenderizer mechanism (discussed below). Mounted on the housing cover 12 are two spring loaded knobs 16 (one not shown) that engage recesses or holes 18 in the housing base 14 to secure the cover 12 in position.

Meat is fed into the tenderizer unit 10 via a cover slot 20 at the top of the cover 12 as a crank handle 22 is turned, operating the tenderizer mechanism contained within the housing. Roller bearings 24 of the tenderizer mechanism are connected to allow rotation of roller assemblies (not shown) within the housing. The tenderizer mechanism and roller assemblies are discussed in greater detail with respect to FIGS. 2, 3, and 4.

A horizontal slot 26 in the lower portion of two sides of the base 14 is designed to receive and support a removable tray 28. Once the meat passes through the tenderizing mechanism the meat is dropped onto the receiving tray 28 which is drawn outward for easy access to the meat by the operator. Rubber suction cups or feet 30 are attached to the bottom of the base 14 and are utilized to hold the tenderizer unit stable when operated.

Figure 2:
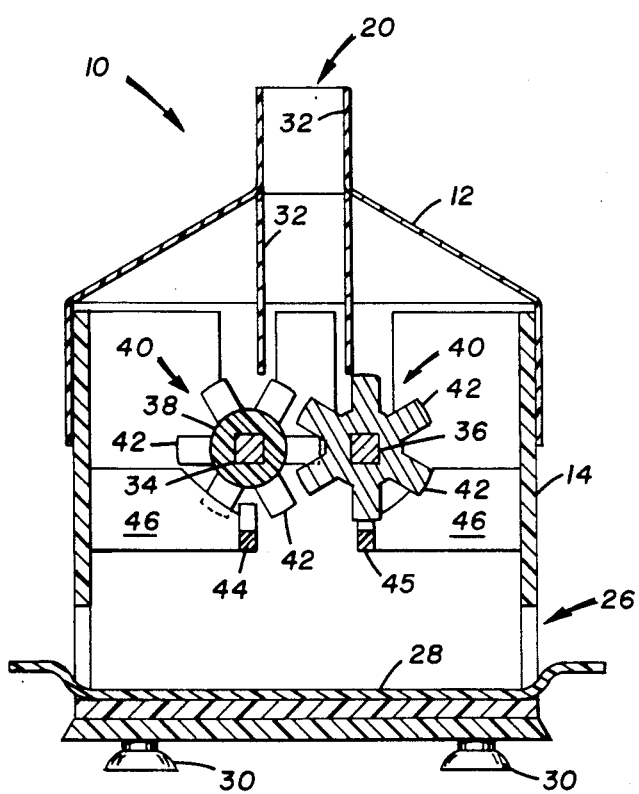
FIG. 2 depicts a cut away view of the invention.

FIG. 2 shows a cut away view of the tenderizing unit 10 of FIG. 1. Meat entering the unit 10 at cover slot 20 is guided to the tenderizing mechanism by vertical feed guides 32. The feed guides 32 prevent the meat from being misdirected within the unit 10 which may result in the tenderizing mechanism being jammed. The meat then encounters two roller assemblies of the tenderizing mechanism which comprise the means for tenderizing the slice of meat.

Each roller assembly includes an axle 34, 36 having a square cross-section on which an alternating series of spacers 38 and bladed disks 40 are mounted. The spacers 38 and bladed disks 40 have square holes at their centers for appropriate mating with the axles 34, 36. The series of spacers 38 and bladed disks 40 of axle 34 are shifted with respect to the series of axle 36 such that a bladed disk 40 of one axle is opposite a spacer 38 of the other axle.

Each bladed disk 40 is provided with a multiplicity of cutting edges 42, that engage the surface of the meat, severing its tissues as the tenderizer mechanism is operated. The axles 34, 36 are positioned and the bladed disks 40 dimensioned such that the bladed disks 40 of one axle (34, for instance) overlap the bladed disks 40 of the other axle (36). Rotation of crank handle 22 (See FIG. 1) causes the left axle 34 to rotate clockwise while the right axle 36 rotates counterclockwise, drawing the meat between the roller assemblies.

Immediately below the roller assembly on the left axle 34 is a stripper plate 44 secured to the inside of the base 14 via supports 46. The stripper plate 44 and supports 46 may be better observed in FIG. 3 and are discussed in greater detail below. Immediately below the roller assembly on the right axle is a stripper plate 45 secured to the base 14 via supports 46. As is evident from FIG. 2, receiving tray 28 is positioned beneath the roller assemblies to catch the tenderized meat. The receiving tray 28 is then pulled to the left or right (as viewed in FIG. 2) from the horizontal slot 26 for removal of the meat from the tenderizing unit 10.

Figure 3:
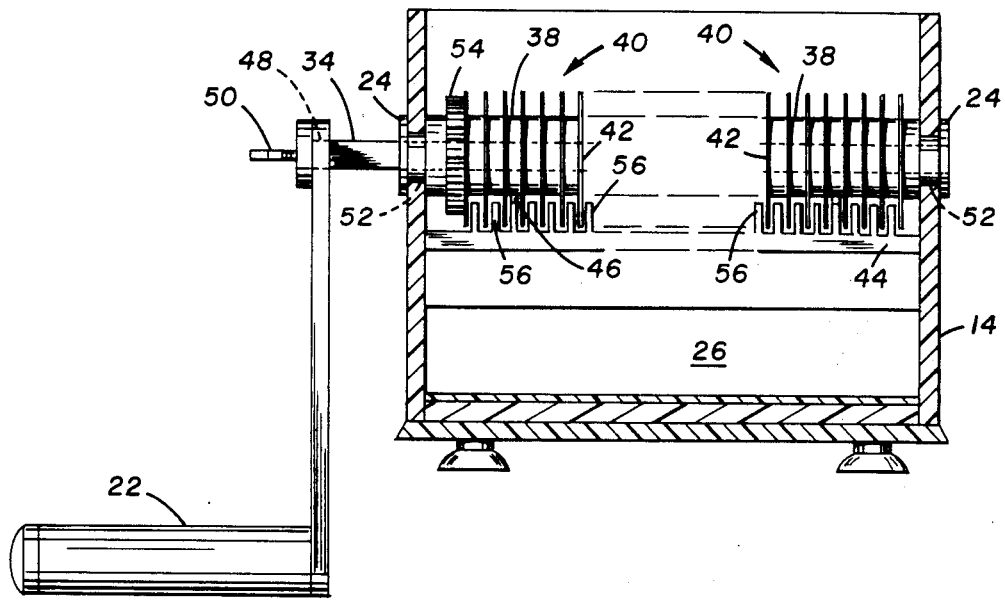
FIG. 3 reveals the details of a roller assembly and stripper plate as viewed sectionally along axle 22.

FIG. 3 shows a sectional view of the invention along the axle 34 from which the details of the tenderizing mechansim (crank handle 22, roller assemblies, stripper plate 44 and supports 46) are readily apparent. The crank handle 22 is provided with a square hole 48 and is mated with the axle 34. A thumb screw 50 is turned into a threaded hole at the end of axle 34 securing the crank handle 22 in position.

To the right of the crank handle 22 and at the opposite end of the roller assembly is a roller bearing 24, a nylon spool-shaped free-rolling wheel through which the axle 34 also passes. A screw secures the roller bearing 24 in place on the axle 34. The entire roller assembly is suported via vertical slots 52 in the base 14 and is a typical arrangement for each end of the right roller assembly built around axle 36.

The axle 34 roller assembly may be positioned with the handle 22 to either side of the base 14 as desired for left or right handed operation. Inside both of the roller bearings 24 is a gear 54. The roller assembly of axle 36 (not shown) is also provided with two gears 54 that mesh with the gears 54 of the axle 34 roller assembly, the axles 34 and 36 being spaced appropriately due to the location of the vertical slots 52.

Similar but shorter slots are provided on the cover 12 which engage the top of the roller bearings 24 when the cover 12 is in place. An alternating series of bladed disks 40 and spacers 38 then follow the gear 54, the series being terminated at the right by a roller bearing 24. Such an arrangement is typical of the axle 36 roller assembly, however the alternating series begins with a spacer 38 followed by a bladed disk 40.

Thus, with the roller assemblies in place, a bladed disk 40 of one axle rotates opposite a spacer 38 of the second axle, permitting a slight overlap of the bladed disks 40. As the axles 34, 36 are rotated, each cutting edge 42 revolves through an imaginary vertical plane that corresponds to the path the meat travels when passing between the roller assemblies.

The stripper plate 44 with numerous teeth 56 is attached to sides of the base 14 and is located just below the roller assembly on axle 34. The spacing between the teeth 56 allows a bladed disk 40 sufficient clearance to spin, yet is narrow enough to strip or scrape from the bladed disk 40 the tenderized meat slice and any meat particles which have accumulated thereon. With this provision, the bladed disks 40 are freed of meat particles which would inhibit additional meat tenderizing. If permitted to accumulate, efficient operation of the unit may be substantially impaired.

The stripper plate 45 located just below the roller assembly on axle 36, as shown in FIG. 2, serves the same purpose as stripper plate 44 located just below the roller assembly on axle 34.

Figure 4:
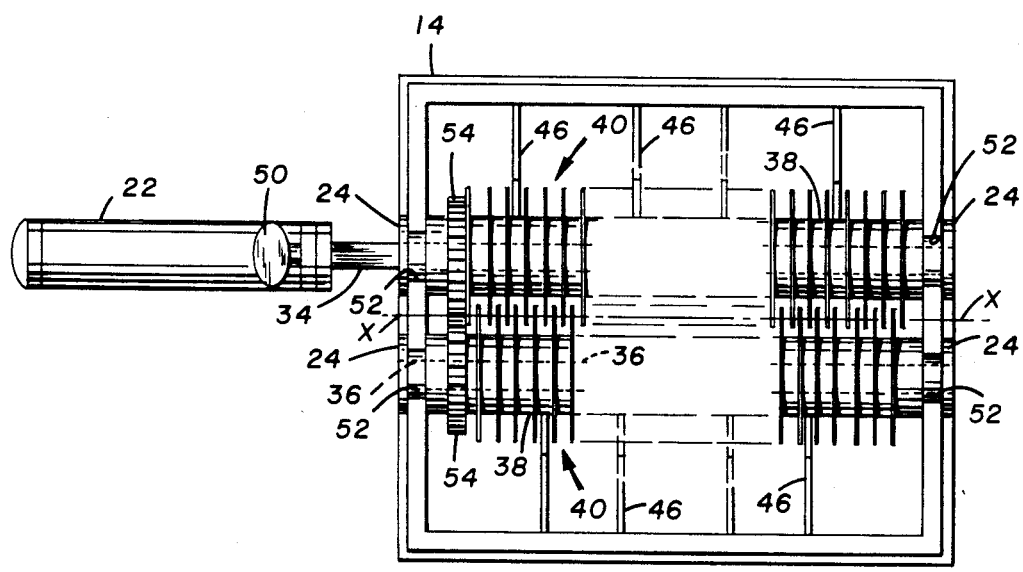
FIG. 4 is a top view of the invention with the housing cover removed.

FIG. 4 shows a plan view of the invention with cover 12 removed, portraying the relationship of two roller assemblies to one another. From this view, the interrelationship of the two roller assemblies can be appreciated. The four roller bearings 24 at each end of the two axles 34, 36 are positioned in the four vertical slots 52. The location of the slots 52 in base 14 insures a mesh between the gears 54 for correct operation of the invention.

As the crank handle 22 is turned the directly connected roller assembly of axle 34 is rotated. The axle 36 roller assembly is driven indirectly via the meshed gears 54 in response to turning of the crank handle 22. The overlap of the bladed disks 40 is apparent in FIG. 4 and line X—X represents the vertical plane through which each cutting edge 42 passes. It can also be seen that each bladed disk 40 of one axle rotates adjacent to a spacer 38 of the second axle.

Eight supports are visible which are attached to the stripper plates 44 and 45 and the base 14 for supporting the stripper plates 44 and 45 in a manner that properly positions the teeth 56 (not shown) in FIG. 4 with respect to the bladed disks 40.

The tenderizing unit 10 is easily disassembled for cleaning. To disassemble the unit, the receiving tray 28 is drawn from the horizontal slot 26 and the cover 12 is removed. The roller assemblies are then lifted from the vertical slots 52 revealing the stripper plates 44, 45 and their supports 46.

Each roller assembly may then be cleaned by hand with a brush and dishwashing liquid. Cleaning of the base 14 interior is also simple with the roller assemblies set aside. The safety cover 12 and the receiving tray 28 may also be cleaned with a cloth and dishwashing liquid, thus maintaining the entire unit in a sanitary condition.

Other modifications of the tenderizing unit are apparent to one skilled in the art which do not depart from the spirit of the invention.

For instance, the axles 34 and 36 cross-section and hole shape of the bladed disks 40 and spacers 38 may be triangular, rectangular, pentagonal, etc. A screw or pin may be used to attach the crank handle assembly 22 to the axle 34 instead of thumbscrew 50.

The described embodiments are therefore considered to be only illustrative and not restrictive; the scope of the invention being defined by the appended claims.

What is claimed is:

1. Apparatus for tenderizing meat comprising,
   a pair of removable roller assemblies, each roller assembly of said pair of roller assemblies having at least one gear, wherein said one gear of each of said pair of roller assemblies meshes with said at least one gear of the other of said roller assembly of said pair of roller assemblies, a cutting means, said cutting means being an alternating series of a plurality of spacers and a plurality of bladed disks, each bladed disk of said plurality of bladed disks having a plurality of cutting edges, a portion of said plurality of bladed disks being assembled on each of said pair of roller assemblies; a pair of axles, a pair of roller bearing assemblies for mounting each of said roller assemblies on their respective axle of said pair of axles; each of said pair of roller bearing assemblies including a removable axle and two removable roller bearings secured to opposite ends of each axle, the axle of one of the pairs of roller assemblies having an extension; a housing, said housing comprising a base with a horizontal slot and a removable cover having a slot therein through which meat is inserted, said removable cover having at least vertically arranged side and end walls for substantially enclosing said pair of roller assemblies and said plurality of bladed disks, spring load knobs attached to said cover and recesses in said base which are engaged by said spring loaded knobs, for securing said cover to said base, said end walls having corresponding vertically arranged slots therein for receiving the removable axles of said pair of removable roller assemblies; feed guides attached to said cover and extending toward said pair of roller assemblies from said slots for grinding said meat;
   a crank handle, a thumb screw means, said thumb screw means attaching said crank handle to the extension of one of said pair of roller assemblies outside said housing for driving said pair of roller assemblies such that said cutting means tenderizes said meat inserted through said slot;
   a receiving tray positioned in said horizontal slot and from which said receiving tray is drawn and a means in said tray for receiving said meat from said pair of roller assemblies.

2. Apparatus for tenderizing meat as defined in claim 1, wherein one alternating series of plurality of spacers and plurality of bladed disks is shifted with respect to the other alternating series of plurality of spacers and plurality of bladed disks such that one of said plurality of bladed disks of one said axle rotates opposite one of said plurality of spacers of the other said axle.

3. Apparatus for tenderizing meat as defined in claim 2, each said axle having a square cross-section and each of said plurality of spacers and bladed disks having square holes for mating with said axle.

4. Apparatus for tenderizing meat as defined in claim 3, including a stripping means adjacent to said plurality of bladed disks for removing meat particles therefrom.

5. Apparatus for tenderizing meat as defined in claim 4, wherein said stripping means comprises a stripping plate having teeth between which said bladed disks individually rotate, and a support which is attached to said base and said stripper plate for support thereof.

* * * * *